(12) United States Patent
Hendry et al.

(10) Patent No.: US 6,282,646 B1
(45) Date of Patent: Aug. 28, 2001

(54) SYSTEM FOR REAL-TIME ADAPTATION TO CHANGES IN DISPLAY CONFIGURATION

(75) Inventors: Ian Hendry, San Jose; Eric Anderson, Los Gatos, both of CA (US); Fernando Urbina, Colorado Springs, CO (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/074,300

(22) Filed: May 8, 1998

(51) Int. Cl.[7] ........................................................ G06F 1/24
(52) U.S. Cl. ............................................................... 713/100
(58) Field of Search ................................. 713/100; 710/8, 710/10, 17, 46, 47, 48; 714/5, 7

(56) References Cited

U.S. PATENT DOCUMENTS

| | | | | |
|---|---|---|---|---|
| 5,014,193 | * | 5/1991 | Garner et al. ........................ | 364/200 |
| 5,276,630 | * | 1/1994 | Baldwin et al. ...................... | 364/505 |
| 5,282,268 | * | 1/1994 | Mieras et al. ........................ | 395/164 |
| 5,469,223 | * | 11/1995 | Kimura ................................ | 348/581 |
| 5,682,529 | * | 10/1997 | Hendry et al. ....................... | 395/653 |
| 5,825,359 | | 10/1998 | Derby et al. ......................... | 345/344 |

* cited by examiner

Primary Examiner—William Grant
Assistant Examiner—Ronald D. Hartman, Jr.
(74) Attorney, Agent, or Firm—Burns, Doane, Swecker & Mathis, L.L.P.

(57) ABSTRACT

A hot-plugging capability for video devices is achieved by shifting the responsibility for recognizing changes in the configuration of a display environment from a computer's operating system to a device manager. When an input/output device is added to or removed from the computer system, an interrupt signal informs a device manager of the fact that a change in configuration has occurred. In response thereto, the device manager determines whether the changed component relates to the computer's display function. If so, the device manager makes a call to the computer's display manager, to inform it of the fact that the display configuration has changed. In response to this call, the display manager reconfigures the display space for the computer system and notifies clients as appropriate, to accommodate display features associated with the added component. With this change in the configuration of the display space, the added component becomes immediately available for use.

33 Claims, 3 Drawing Sheets

SYSTEM FOR REAL-TIME ADAPTATION TO CHANGES IN DISPLAY CONFIGURATION

FIELD OF THE INVENTION

The present invention is directed to computer display systems, and more particularly to a display system which is capable of instantaneously accommodating changes in the configuration of a computer system.

BACKGROUND OF THE INVENTION

As computers become more prevalent in everyday use, particularly personal type computers, users are employing them in a variety of different situations. Depending upon the particular situation, the user may desire to change the configuration of the display devices connected to the computer. For example, portable computers of the so-called laptop or notebook type have become increasingly popular because of their small size and light weight, making them suitable for use while traveling. Due to the need to keep their dimensions to a minimum, the display screens built into such computers are relatively small in size, and may offer only limited display capabilities. Therefore, when using one of these types of computers in an office environment, the user may connect it to a monitor having a larger display area and/or enhanced display capabilities. Such a connection might be made, for example, by means of a docking station which enables the portable computer to be conveniently connected to a variety of peripheral devices, or by inserting a video card in a PC Card slot.

Subsequently, the user might remove the added monitor, for example to take the computer home or to use it while traveling. In this situation, the built-in display screen must be used. In other words, the computer must route all information to be displayed to the built-in screen, rather than the port to which the external monitor was connected. In addition, the displayed information must be reformatted, or otherwise processed, to accommodate the display parameters of the built-in device.

In the past, changes in the configuration of the computer system, such as the addition or removal of display devices, only became effective upon a restart, or reboot, of the computer system. As part of its initial startup procedure, the computer's operating system detects the presence of each device driver loaded on the system, and registers each such detected driver to permit communications to be carried out between the operating system and the device with which the driver is associated. If a new device and corresponding driver are added to the system after this initialization procedure, the driver is not registered with the operating system, and therefore communications do not take place until the operating system goes through its initialization procedure again, e.g. upon the next reboot of the computer. Hence, if a user adds a monitor to the computer system, the monitor cannot be used to display information generated by the computer until it has been rebooted.

U.S. Pat. No. 5,682,529 discloses a system for dynamically accommodating changes in the display configuration of a computer, without the need to restart the computer. In the system of this patent, changes can be made to the display environment for a computer system while it is in a sleep mode, in which the computer's central processing unit is maintained in a minimal operating state. When the computer is "awakened" from this sleep mode, the system of the '529 patent enables the changed configuration to be immediately recognized, and thereafter utilized in the display of information generated by the computer.

As the capabilities offered by personal computers continue to expand, the opportunities for changing the configuration of computers grows in a concomitant manner. In some situations, users may desire to have changes in the configuration of the computer's display environment become instantaneously effective, without the need to restart the computer or even place it in a sleep mode. For example, the user may create a slide presentation on a notebook computer. During the course of a meeting, a user may desire to immediately display the slide presentation, by connecting the computer to a suitable video projector, or the like. It is desirable to be able to carry out this operation without the need to first put the computer to sleep, and thereby reduce the time needed to operate within the changed configuration. It is an objective of the present invention, therefore, to expand upon the capabilities of the system of the '529 patent, by providing a display environment in which so-called "hot plugging" of displays is possible, wherein a display becomes immediately available for use as soon as it is plugged into the computer system.

SUMMARY OF THE INVENTION

In accordance with the present invention, the foregoing objective is achieved by utilizing a device manager to automatically recognize and react to changes in the configuration of a display environment, rather than wait for the computer's operating system to proactively determine the status of the display environment, for example upon restarting. When an input/output device is added to or removed from the computer system, an interrupt signal informs the device manager of the fact that a change in configuration has occurred. In response thereto, the device manager determines whether the changed component relates to the computer's display function. For example, it may determine whether an added device is a video card. If so, the device manager makes a call to the computer's display manager, to inform it of the fact that the display configuration has changed. In response to this call, the display manager reconfigures the display space for the computer system, to accommodate an additional frame buffer that is associated with the added component. With this change in the configuration of the display space, the added component becomes immediately available for use.

By means of this approach, the user can add a second monitor or other hardware component to a computer and begin to use the monitor as soon as it has been connected, without the need to reboot the computer or otherwise interrupt its current operating state.

Further features and advantages of the invention are explained in detail hereinafter in the context of specific embodiments that are described with reference to the accompanying drawings.

DETAILED DESCRIPTION

Figure 1:
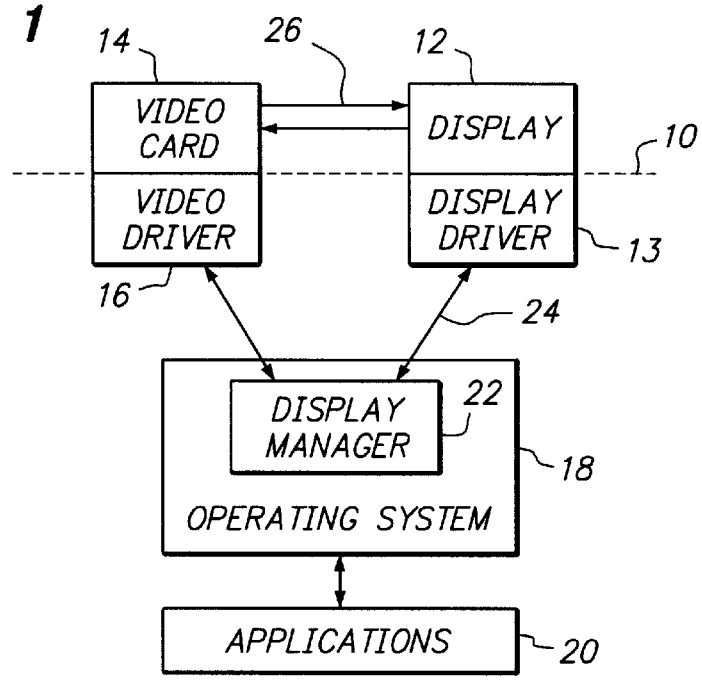
FIG. 1 is a block diagram of an overall display system architecture.

The present invention is directed to the display environment of a computer system. A block diagram of the overall architecture for a display environment is illustrated in FIG. 1. In this figure, hardware components of the computer system are illustrated above a dashed line 10, and software components are depicted below the line. These software components are stored in a suitable computer-readable medium, such as a magnetic disk, and loaded into the computer's working memory, i.e. RAM, for execution. The system can include display devices 12, e.g. monitors, LCD screens and/or plasma displays, although actual display devices need not be physically present in order for the principles of the invention to be operative. Each display device is connected to, and controlled by, a video card 14 which operates in accordance with video driver software 16. Although depicted as being on a separate substrate, such as a printed circuit board, the components of at least one video card could be incorporated with other components on a single substrate, such as the computer's motherboard.

One or more software programs, such as application programs 20, generate information to be displayed on the display devices. Examples of such information include text, windows and other graphical objects, and control structures such as menus and dialog boxes. This information is presented to the display device through the computer's operating system 18, which also generates its own information to be presented on the display. The operating system communicates with the display device through an associated display driver 13, which constitutes a software component that corresponds to the hardware of the display device 12.

The operating system includes a display manager 22, which provides communication between each of the software components, and dynamically configures the display devices 12. The communication between the various software components and the hardware devices takes place via their associated drivers, e.g. the video driver and the display driver. In this regard, many video displays have the capability to provide information regarding their available modes of operation and/or timing specifications. Some displays, so-called "smart displays," are capable of providing information about their modes of operation directly, for example in response to inquiries. For these types of displays, the display manager 22 communicates directly with the display device, by means of the display driver 13, over a communication channel 24. This communication channel can be a bus within the computer, a serial line, or any other suitable path for exchanging information between the display manager and the display driver 13 of the display device.

In some cases, the display device may not be able to communicate its capabilities directly. However, through the use of a lookup table or the like, the display driver 13 can obtain information regarding the display's capabilities, and provide them to the display manager.

The display manager also communicates with other parts of the operating system 18 and the other software programs 20 that are running on the computer. For example, in response to operator commands, the operating system can instruct the display manager to add a new device to a list of active displays, or remove a device therefrom. In response thereto, the display manager informs the application programs 20 of the new display configurations, to enable them to update their displayed information accordingly.

Figure 2:
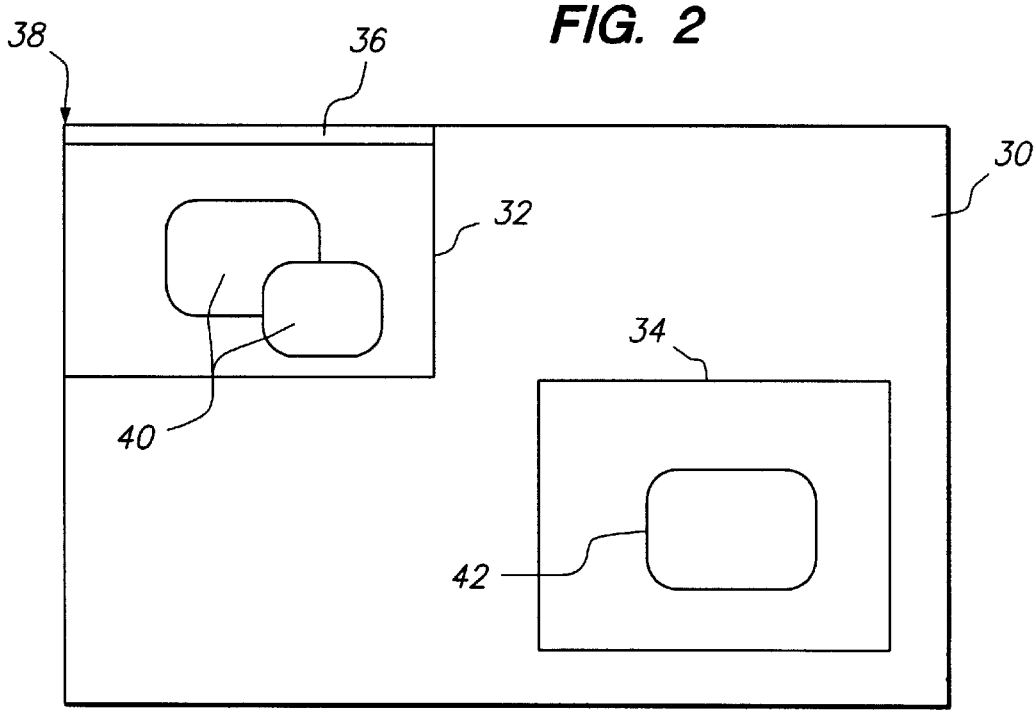
FIG. 2 illustrates an example of a display environment.

In one known implementation for computer systems, the display environment can generally be considered to be defined by a global coordinate space 30, as depicted in FIG. 2. Objects and other information to be displayed can be positioned anywhere within this space, as determined by the user and/or the software program that generates the information. A reference point in this space, e.g. its origin or 0,0 coordinate point, is usually established with reference to some object that is always present in the display. For instance, most graphical user interfaces include some type of menu bar or other structure which enables the user to access basic commands to control the computer. The device which displays this menu bar is known as the main display device. If the computer system contains multiple display devices, only one of the devices is designated as the main device, even if multiple devices contain the menu bar. The origin of the coordinate display space is typically established with reference to the menu bar. For example, as illustrated in FIG. 2, the 0,0 point 38 in the coordinate space can coincide with the top left corner of a menu bar 36. The positions of all objects and other information to be displayed in the display space 30 are defined by their coordinates within this space. The operating system receives this coordinate information, for example from the software programs 20 which generate the information, and provides it to the display driver to cause the information to appear at the appropriate place on the screen of the display device located at the corresponding position in the display space.

In the example illustrated in FIG. 2, the display environment consists of two display devices, 32 and 34, within the global display space 30. A menu bar 36 is displayed at the top of the screen for the device 32, which is therefore the main display device. Accordingly, the origin 38 of the display space coincides with the top left corner of the device 32. As illustrated in FIG. 2, the user has caused some objects, e.g. windows 40, to be displayed on the device 32, and another object 42 to be displayed on the device 34.

Figure 3:
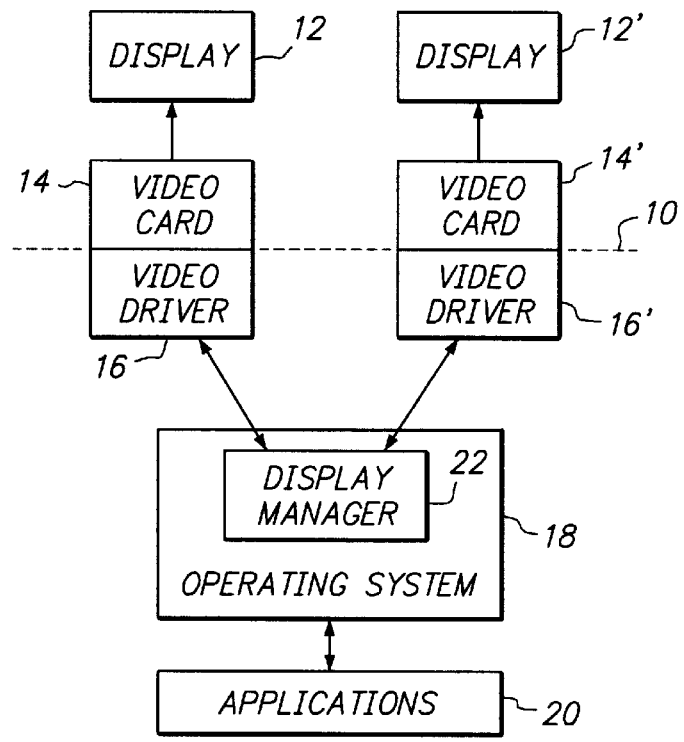
FIG. 3 is a block diagram of a display system architecture which includes plural video cards and display devices.

FIG. 3 illustrates the configuration of the computer system for the particular example illustrated in FIG. 2, which includes two display devices. Each display device is connected to an associated video card, which includes a corresponding video driver. For the sake of simplicity in FIG. 3, the display drivers are not separately illustrated, but are assumed to be present within the system, in a manner analogous to the arrangement shown in FIG. 1. The embodiment of FIG. 3 includes two video cards 14 and 14', respectively associated with the two video display devices 12 and 12'. Each of the video cards communicates with the display manager 22, by means of its associated video driver 16 and 16'.

Among other components, each video card includes a frame buffer, e.g. random access memory, which stores the data for the image that is displayed on its associated display device 12. In essence, the display manager 22 assigns the frame buffer to a corresponding portion of the global coordinate space 30. In the example of FIG. 2, the two frame buffers are assigned to mutually exclusive portions of the global space. However, some or all of the portion assigned to one of the frame buffers could overlap with the area assigned to the other frame buffer. In this case, the same image, or portion of an image, appears on both display devices.

At any given time, there could be only one video card connected to the computer, or both cards could be connected. Furthermore, in the case of a network server or the like, it is possible that no video card would be present over certain periods of time. Even when both cards are present, only one of them may have a monitor or other display device connected to it at any particular point in time.

In the case of a conventional desktop or notebook computer system, one of the video cards might be incorporated within the structure of the computer system, and may not be designed to be repeatedly inserted and removed by the user. Additional video cards, however, might be capable of being easily inserted into and removed from the computer system. For example, the video card might be implemented in a removable card that conforms to the PC Card standard. This standard defines the form factor for relatively small, credit-card shaped I/O devices, which are designed to be easily inserted into and removed from computer housings, to provide a computer with different capabilities. Included among the types of I/O devices that can be embodied in such a card are modems, facsimile devices, network interface cards, wireless communications devices and hard disk drives.

Figure 4:
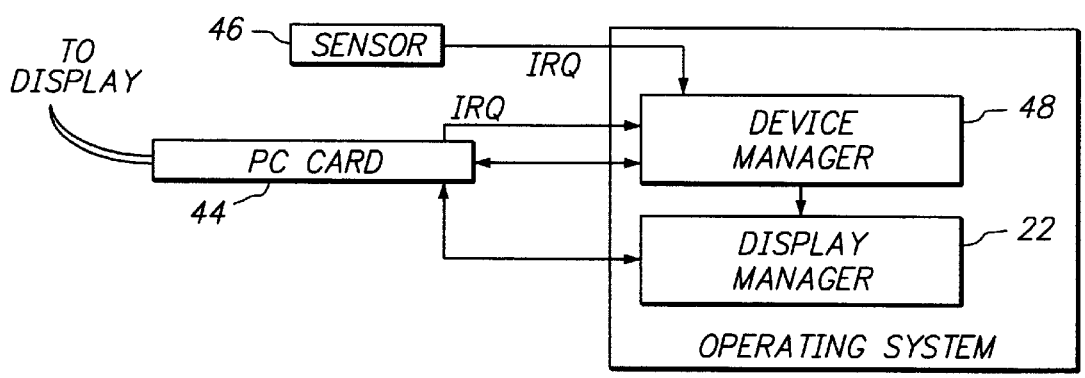
FIG. 4 is a block diagram illustrating the operation of the device manager.

Devices of this type which conform to this standard, commonly known as PC Cards, are designed to be readily inserted and removed from the computer housing. The detection of the presence of such devices, as well as their removal from the system, is handled by a portion of the computer's operating system that is referred to herein as a device manager. Referring to FIG. 4, when a PC Card 44 is inserted into the housing of the computer, it actuates a switch 46, or equivalent sensor device, which sends an interrupt signal IRQ to the device manager 48. In response to this interrupt, the device manager determines the type of device which has been inserted, and informs the operating system 18. In a similar manner, whenever the PC Card is removed from the computer housing, an interrupt is also sent to the device manager, which in turn notifies the operating system that the device is no longer available.

Another type of change which can be made to the display configuration of the computer is the addition or removal of a display device. In the example of FIG. 3, for instance, either one of the display devices 12 or 12' could be disconnected from its associated video card 14 or 14'. Furthermore, if only one display device is present, it could be disconnected from one of the video cards 14 and connected to the other video card 14'. Whenever a change of this nature occurs, an interrupt is sent to the device manager 48. For instance, the interrupt could be generated by the video card, upon detecting that a display device has been physically connected to or disconnected from it. Alternatively, the interrupt could be provided by a bus that is capable of detecting such a change.

The addition or removal of other types of hardware can also result in a change in the display configuration of the computer system. For example, a graphics accelerator card can be added to the system by means of a PC Card slot. Again, upon the addition or removal of such a device, an interrupt signal IRQ is sent to the device manager.

The present invention is particularly directed to the situation in which the device that is added to or removed from the computer system is related to the display function. In the past, it was necessary to reboot the computer system in order for a change in video hardware to become effective. More particularly, unless a reboot occurred, the operating system was not prompted to undertake any action which would cause it to detect the presence of a new driver, resulting from the addition of an associated hardware device. Hence, it was necessary for the user to interrupt the operating state of the computer in order to utilize the additional functionality provided by a newly added hardware. Once the operating system became aware of the presence of the new driver, it could notify the display manager to incorporate the presence of the new frame buffer.

In accordance with the present invention, however, the display system can be immediately responsive to the addition or removal of video hardware, so that the capabilities of a revised configuration can be employed without the need to change the operating state of the computer. This functionality is accomplished by, in effect, bypassing the need to have the operating system actively determine the addition or removal of a display device. Rather, the notification of a change in the configuration of the display environment is provided directly to the display manager, so that it can directly account for the presence or absence of a particular video device.

To this end, whenever a PC Card is added to or removed from the computer system, the device manager determines whether the card relates to a display function. A similar determination is made whenever an interrupt is generated that indicates some other type of hardware has been added or removed, e.g. a display monitor. In addition to, or in lieu of interrupts, other approaches can be employed to determine when a device has been added or removed. For example, the operating system can periodically poll all of the computer system's I/O ports, to determine which devices are present and which ones might have been removed.

Figure 5:
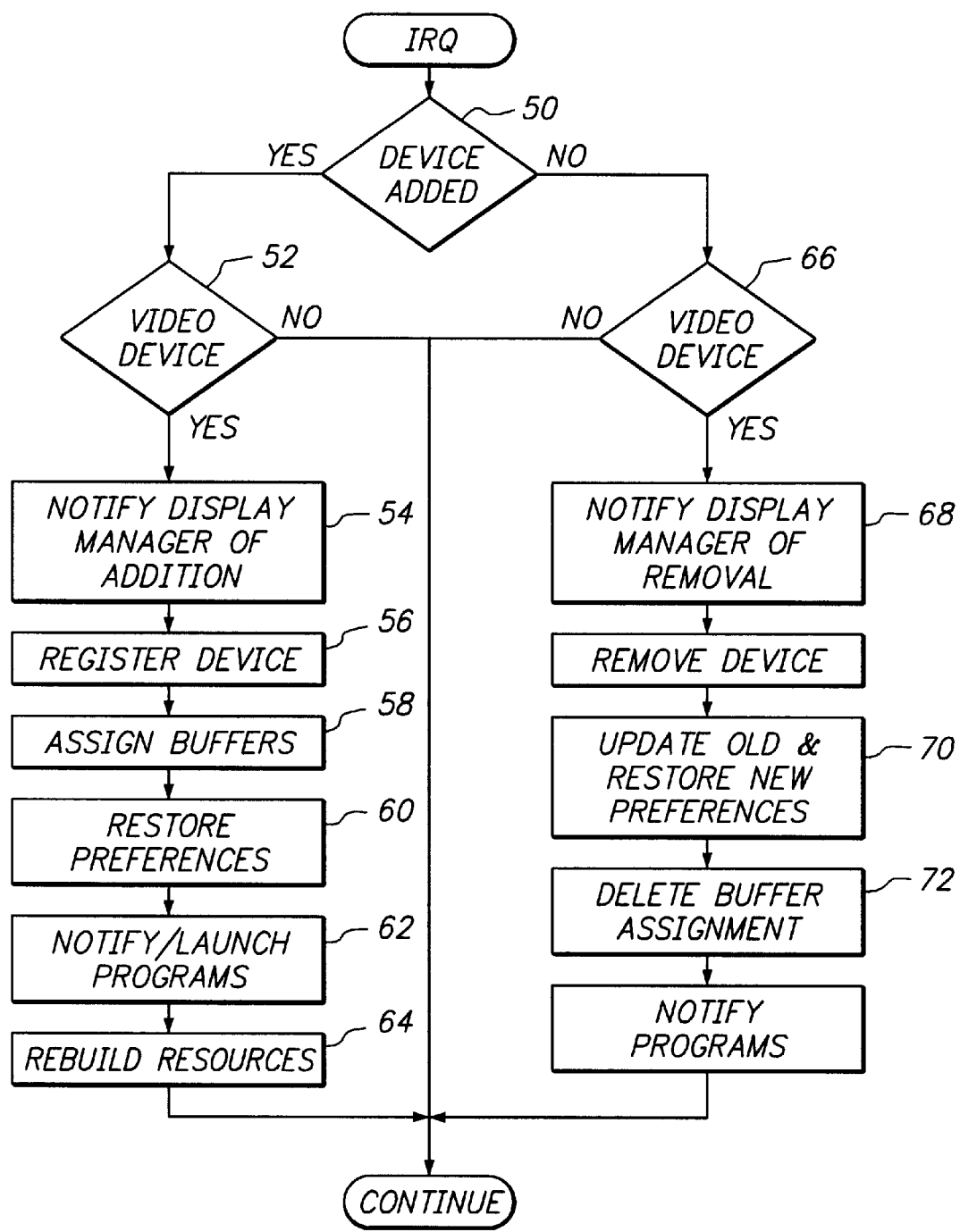
FIG. 5 is a flowchart illustrating the process by which changes in the configuration of the display environment become immediately available to the user, in accordance with the principles of the invention.

Referring to FIG. 5, upon receipt of an indication that there has been a change in configuration, the device manager first determines at step 50 whether a device has been added or removed. If a device has been added to the system, the device manager communicates with the device to determine its type, at step 52, and stores data in a register regarding the identity and type of the device. If the device responds with an indication that it is a video device, the device manager issues a call to the display manager 22, at step 54. Appropriate parameters can be included with the call, to indicate the type of device, the size of its frame buffer (if applicable), its resolution, and the like.

In response to this information, the display manager carries out a number of operations, depicted in Steps 56–64. First, it registers the added hardware as a new device, along with the location of its associated drivers in memory, at step 56. In some cases, the driver may already be present in memory, but in an inactive state because the device was not connected to the system at the time of initial boot. In this case, the display manager switches the driver to an active state.

After registering the device, the display manager matches each display device with an available frame buffer at step 58. If a new video card is inserted, for example, the display manager assigns a portion of the global coordinate space 30 to the frame buffer in the video card. If a display device is connected to that video card, the display manager assigns that device to the frame buffer for that card, so that the proper data is displayed on the device. If a display device is disconnected from one video card and connected to a different video card, the display manager moves objects within the global space 30 so that they are presented to the appropriate frame buffer for the display device. For example, the display manager can move user interface control objects which are specific to that display, such as brightness and contrast controls, to the frame buffer associated with that display. Similarly, if the display has other attributes associated with it, such as a certain name or designation, the display manager ensures that they are directed to the proper frame buffer.

Once the display devices and frame buffers are matched up, the display manager consults a preferences file which indicates whether that device was connected to the system at some previous time. This file is preferably stored in permanent memory, such as a hard disk, and updated each time a video device is added to or removed from the computer system to change its configuration. The file stores the state of the display just prior to the change. For instance, it may store the location of the menu bar and all other objects on the desktop of the user interface, along with each device that made up the configuration. It can store relevant operating parameters for the device as well, such as timing values, color depth, and the like. When a new device is added, the display manager determines whether the changed configuration had existed previously, and if so it attempts to restore the display environment to the state that existed the last time that configuration was present, at step 60. For example, it might move the menu bar and certain icons to the screen of a newly added display device, if they were previously located on that device before it was disconnected, or set the timing of an added frame buffer.

In addition to these actions, at step 62 the display manager can inform currently executing programs of the presence of the new video device, as described in detail in U.S. Pat. No. 5,682,529, the disclosure of which is incorporated herein by reference. Furthermore, other software which is not executing, but which relates to the new device, can be activated. For instance, if a graphics accelerator card is inserted in a PC Card slot, the software associated with that card can be automatically launched.

The display manager also functions at step 64 to rebuild or reconfigure resources that might be employed by the new device. For example, in some display modes a table lookup operation is carried out to determine the colors which are displayed on the monitor. Different application programs may utilize different tables for this purpose. Typically, the window which is in the foreground of a display controls the particular table that is used. Therefore, when windows are moved onto a new display device, for instance in accordance with the preferences file, the display manager rebuilds the color lookup table stored in the frame buffer for that device so that it corresponds to the appropriate window.

If the device manager determines at step 50 that a device has been removed from the system, rather than added, it determines at step 66 whether the removed hardware was a video device, for example by reference to previously stored information which indicated the type of card inserted into each PC Card slot, or the like. If a determination is made that the removed device was part of the video subsystem, the device manager sends a call to the display manager 22, at step 68, to inform it of this fact. In response thereto, the display manager updates the preferences file at step 70, to record the relevant parameters that pertain to the most recent configuration. In addition, the display manager can attempt to restore preferences that pertain to the new condition. Thus, for example, if the computer system had two display devices and one was removed, the preferences file would be updated to store the relevant data for the two-monitor configuration, and then searched to determine whether it contains data for a one-monitor configuration. The display manager then rebuilds the display configuration, at step 72. For example, if the removed device is a video card, the display manager deletes the assignment of a portion of the display space to the now-removed frame buffer. In concert with this action, the display manager can also function to move objects that were previously displayed on the removed display device to an area associated with a remaining display device, as described in greater detail in U.S. Pat. No. 5,682,529. If the removed device had executing software associated with it, the display manager can cause the software to shut down.

A special case can occur if all frame buffers, e.g. video cards, are removed from the system. Since the frame buffer is a memory-mapped I/O device, a program or other device could attempt to address memory that is no longer present. Typically, when such a situation occurs, the operating system recognizes it as an error condition, and shuts down the process which attempted to address the non-existent memory. However, in the system of the present invention, if an attempt is made to address memory in a video device, e.g. a frame buffer, the resulting error condition is treated as an interrupt. This interrupt is relayed to the display manager to cause it to reconfigure the display environment, and delete the assignment of display space to the frame buffer which is no longer present.

Another action that can occur upon removal of a display device is to change the operating mode of its display driver. More particularly, some display devices can operate in one mode in which adjustment of control buttons, such as brightness and contrast controls, is accompanied by user interface feedback, e.g. variation of a sliding scale on the display. This operating mode requires communication with the computer's operating system. In another operating mode, referred to as a remote mode, no such user feedback is provided. In the system of the present invention, when a display device is to be removed, the display manager instructs its display driver to switch to the remote mode, so that no attempt is made to affect the user interface while the device is not present.

From the foregoing, it can be seen that the present invention provides a hot-plugging capability for video devices, that enables users to immediately take advantage of changes in the display configuration of a computer system, such as the addition of a new video card. This functionality is attained by providing notification of the changed configuration directly to the display manager, rather than waiting for an action that prompts the operating system to review the current configuration, such as rebooting the computer.

It will be appreciated by those of ordinary skill in the art that the present invention can be embodied in other specific forms without departing from the spirit or essential characteristics thereof. For example, while one embodiment of the invention has been described in the context of the insertion and removal of video cards that are embodied in PC Cards, it will be appreciated that the principles which underlie the invention are not limited to this particular implementation. Rather, any other suitable mechanism which accommodates the addition and removal of a video device can benefit from the features of the present invention. The presently disclosed embodiments are therefore considered in all respects to be illustrative, and not restrictive. The scope of the invention is indicated by the appended claims, rather than the foregoing description, and all changes that come within the meaning and range of equivalents thereof are intended to be embraced therein.

What is claimed is:

1. A method for reconfiguring a computer system to accommodate changes in a display environment, comprising the steps of:

detecting the addition or removal of an input/output device in the computer system;

determining whether an input/output device which has been added or removed is a video device, in response to said detection;

providing a notification to a display manager when a determination is made that a video device has been added or removed; and modifying the allocation of display space to display devices via said display manager, in accordance with the addition or removal of a video device.

2. The method of claim 1 wherein the video device comprises a video card that includes a frame buffer, and said modification step includes assigning a portion of the display space to the frame buffer of an added video card, or deleting the assignment of a portion of the display space to a removed video card.

3. The method of claim 1 wherein said display manager further carries out the step of storing a preferences file that identifies the status of displayed objects prior to a change in the configuration of a computer.

4. The method of claim 3 wherein, upon detection of the addition of a video device, said display manager repositions objects in said display space, in accordance with a status stored in said preferences file.

5. The method of claim 1 wherein said video device is a display device, and said display manager carries out the step of assigning a respective frame buffer, which corresponds to an allocated portion of the display space, to a corresponding display device.

6. The method of claim 1 wherein, upon detection of the addition of a video device, said display manager causes a software program associated with the added device to be launched.

7. The method of claim 1 wherein said display manager further carries out the step of reconfiguring a computer resource to correspond to the status of objects located in the display space.

8. The method of claim 7 wherein said computer resource is a color look-up table.

9. The method of claim 1, further including the step of recognizing an error condition resulting from an attempt to address a frame buffer that has been removed, providing a notification to said display manager in response to said error condition, and deleting an allocation of display space to the removed frame buffer.

10. A system which provides hot-plugging capabilities for display devices, comprising:
   a video device including a frame buffer for storing data that defines an image to be displayed on an associated display device;
   a display manager which defines a display space and assigns a portion of said display space to said frame buffer, and which provides data for images to be displayed to said frame buffer; and
   a device manager which detects the addition or removal of a device in a computer system, determines whether a device which has been added or removed is a video device, and provides a notification of such addition or removal to the display manager when a video device is determined to have been added or removed, to cause the assignment of a portion of the display space to be modified in accordance with a detected addition or removal.

11. The system of claim 10, wherein said display manager launches a software program associated with the video device in response to notification that the video device has been added.

12. The system of claim 11 further including a preference file stored in memory which indicates the status of objects being displayed when a video device is removed.

13. A system which provides hot-plugging capabilities for display devices, comprising:
   at least one display for displaying images;
   a display manager which defines a display space and assigns a portion of said display space to a display device, and which provides data for images to be displayed on said display device; and
   a device manager which detects the addition or removal of a device in a computer system, determines whether a device which has been added or removed is a display device, and provides a notification of such addition or removal to the display manager when a display device is determined to have been added or removed, to cause the assignment of a portion of the display space to be modified in accordance with a detected addition or removal.

14. The system of claim 13 further including a frame buffer which is associated with an assigned portion of the display space, and wherein said display manager modifies said assignment by associating said frame buffer with said display device.

15. The system of claim 13 further including a preference file stored in memory which indicates the status of objects being displayed when a display device is removed.

16. A computer-readable medium containing a device manager program and a display manager program, wherein said device manager program performs the steps of
   detecting the addition or removal of an input/output device in a computer system,
   determining whether the input/output device is a video device, and
   providing a notification to the display manager program when a video device is added or removed;
   and wherein said display manager performs the step of:
      modifying the allocation of display space to display devices in response to said notification from the device manager.

17. The computer-readable medium of claim 16, wherein said display manager further performs the steps of storing a preference file relating to the status of objects appearing on a display device, and restoring objects to the status stored in the preferences file when a video device is added.

18. The computer-readable medium of claim 16, wherein said display manager performs the step of assigning a respective frame buffer to a display device in response to said notification of an added display device, or deleting the assignment of a respective frame buffer from said display device in response to said notification of a removed display device.

19. The computer-readable medium of claim 16, wherein said display manager performs the further step of launching a software program in response to said notification.

20. The computer-readable medium of claim 16, wherein said display manager performs the further step of reconfiguring at least one computer resource in accordance with the modification of the display space allocation.

21. The computer-readable medium of claim 20, wherein said computer resource is a color look-up table.

22. The method of claim 3, wherein said preference file stores the video devices which make up the configuration of the computer, and the locations of objects displayed on said video devices.

23. The method of claim 22, wherein said preferences file also stores operating parameters for said devices.

24. A method for reconfiguring a computer system to accommodate changes in a display environment, comprising the steps of:
   detecting the addition or removal of a video device in the computer system;
   providing a notification to a display manager that a video device has been added or removed;
   modifying the allocation of display space to display devices via said display manager, in accordance with the addition or removal of a video device; and reconfiguring a color look-up table to correspond to the status of objects located in the display space.

25. A system which provides hot-plugging capabilities for display devices, comprising:

a video device including a frame buffer for storing data that defines an image to be displayed on an associated display device;

a display manager which defines a display space and assigns a portion of said display space to said frame buffer, and which provides data for images to be displayed to said frame buffer;

a device manager which detects the addition or removal of the video device to a computer system, and provides a notification of such addition or removal to the display manager to cause the assignment of a portion of the display space to be modified in accordance with a detected addition or removal; and means responsive to the removal of a video device for storing a preference file in memory which indicates the status of objects being displayed.

26. The system of claim 25, wherein said display manager is responsive to the addition or removal of a video device to restore displayed objects to a status stored in said preference file which corresponds to the configuration of the computer system after the video device is added or removed.

27. The system of claim 25, wherein said preference file stores the video devices which make up the configuration of the computer, and the locations of objects displayed on said video devices.

28. The system of claim 27, wherein said preferences file also stores operating parameters for said devices.

29. A computer-readable medium containing a device manager program and a display manager program, wherein said device manager program performs the steps of:

detecting the addition or removal of a video device in a computer system, and providing a notification to the display manager program when a video device is added or removed;

and wherein said display manager performs the steps of:

modifying the allocation of display space to display devices in response to said notification from the device manager, and storing a preference file relating to the status of objects appearing on a display device, and restoring objects to the status stored in the preferences file when a video device is added.

30. The computer-readable medium of claim 29, wherein said preference file stores the video devices which make up the configuration of the computer, and the locations of objects displayed on said video devices.

31. The computer-readable medium of claim 30, wherein said preferences file also stores operating parameters for said devices.

32. A computer-readable medium containing a device manager program and a display manager program, wherein said device manager program performs the steps of:

detecting the addition or removal of a video device in a computer system, and providing a notification to the display manager program when a video device is added or removed;

and wherein said display manager performs the step of:

modifying the allocation of display space to display devices in response to said notification from the device manager, and reconfiguring at least one computer resource in accordance with the modification of the display space allocation.

33. The computer-readable medium of claim 32, wherein said computer resource is a color look-up table.

* * * * *